United States Patent
Wipf et al.

(10) Patent No.: US 11,741,815 B2
(45) Date of Patent: Aug. 29, 2023

(54) USING TRANSACTION LOGS TO DETERMINE THAT AN UNDETECTED ITEM WAS NOT SCANNED AT A SELF-SERVICE TERMINAL

(71) Applicant: Target Brands, Inc., Minneapolis, MN (US)

(72) Inventors: Andrew James Wipf, Minneapolis, MN (US); Christopher M. Brakob, Maple Grove, MN (US); Kathleen Jacqueline Roush, Robbinsdale, MN (US); Ryan David Siskind, Minneapolis, MN (US); Francisco Cancino, III, Millbrae, CA (US)

(73) Assignee: Target Brands, Inc., Minneapolis, MN (US)

( * ) Notice: Subject to any disclaimer, the term of this patent is extended or adjusted under 35 U.S.C. 154(b) by 423 days.

(21) Appl. No.: 17/092,898

(22) Filed: Nov. 9, 2020

(65) Prior Publication Data

US 2022/0148408 A1 May 12, 2022

(51) Int. Cl.
| | | |
|---|---|---|
| G08B 21/18 | (2006.01) | |
| G06Q 20/18 | (2012.01) | |
| G06Q 20/20 | (2012.01) | |
| G06N 5/04 | (2023.01) | |
| G06Q 30/018 | (2023.01) | |
| G06K 7/14 | (2006.01) | |

(52) U.S. Cl.
CPC .......... *G08B 21/18* (2013.01); *G06K 7/1413* (2013.01); *G06N 5/04* (2013.01); *G06Q 20/18* (2013.01); *G06Q 20/201* (2013.01); *G06Q 20/204* (2013.01); *G06Q 20/208* (2013.01); *G06Q 20/209* (2013.01); *G06Q 30/0185* (2013.01)

(58) Field of Classification Search
CPC ........ G08B 21/18; G06K 7/1413; G06N 5/04; G06Q 20/18; G06Q 20/201; G06Q 20/204; G06Q 20/208; G06Q 20/209; G06Q 30/0185
USPC ...................................... 340/568.1
See application file for complete search history.

(56) References Cited

U.S. PATENT DOCUMENTS

| | | | |
|---|---|---|---|
| 7,942,315 B2 | 5/2011 | He et al. | |
| 8,104,680 B2 * | 1/2012 | Kundu | G06Q 20/00 235/383 |
| 9,892,438 B1 * | 2/2018 | Kundu | G06Q 30/0609 |
| 11,188,726 B1 * | 11/2021 | Gururaja | G07G 1/0045 |
| 11,481,751 B1 * | 10/2022 | Chaubard | G06V 10/82 |
| 2006/0169764 A1 * | 8/2006 | Ross | G07F 19/20 235/375 |
| 2012/0321146 A1 * | 12/2012 | Kundu | G06Q 20/208 340/568.8 |
| 2020/0210865 A1 * | 7/2020 | Mitsuhashi | G06Q 20/382 |

\* cited by examiner

*Primary Examiner* — Kerri L McNally
(74) *Attorney, Agent, or Firm* — Theodore M. Magee; Westman, Champlin & Koehler, P.A.

(57) ABSTRACT

A computer-implemented method obtains a transaction log for a transaction at a self-service terminal during which the self-service terminal fails to detect the presence of an item at the self-service terminal. Features are extracted from the transaction log and the features are applied to a model to generate an inference for the transaction. The inference is used to determine whether to issue an alert that improper scanning has occurred at the self-service terminal.

16 Claims, 6 Drawing Sheets

USING TRANSACTION LOGS TO DETERMINE THAT AN UNDETECTED ITEM WAS NOT SCANNED AT A SELF-SERVICE TERMINAL

BACKGROUND

Self-service terminals such as self-service point of sale systems (POS) allow customers to indicate what items they are purchasing and to make a payment without the aid of a store employee. When an item leaves a store without payment, it is considered to be a "shortage" event. There are several different types of shortage events including leaving an item in a cart without scanning a barcode, bagging an item without scanning a barcode, scanning one item while bagging another item, scanning a fake barcode that has been applied to an item and blocking a barcode during scanning so that the scanning fails.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method obtains a transaction log for a transaction at a self-service terminal during which the self-service terminal fails to detect the presence of an item at the self-service terminal. Features are extracted from the transaction log and the features are applied to a model to generate an inference for the transaction. The inference is used to determine whether to issue an alert that improper scanning has occurred at the self-service terminal.

In accordance with a further embodiment, a self-service terminal includes a scanner that scans items during a transaction to obtain information from barcodes on the items. A processor generates a transaction log based on the obtained information, extracts features from the transaction log and applies the features to a model without information about unscanned items to identify an inference for the transaction. The processor uses the inference to determine whether to issue an alert for the transaction.

In accordance with a still further embodiment, a method includes receiving a number of items scanned during a transaction at a self-service terminal and applying the number of items scanned to a model to obtain an indication of whether the transaction is suspected of involving a shortage event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Some prior art self-service terminals have attempted to detect shortage events by using a scale in a bagging area of the self-service terminal. When an item is scanned, the user is instructed to place the item in the bagging area and the weight of the item is compared to a stored weight for the item. If the weights do not match, the system generates an alert that there is an unexpected item in the bagging area. Such systems can be easily defeated. In particular, if an item is left in a cart and is not scanned, the system is unable to detect that there was an unscanned item at the terminal during the transaction. Other systems have attempted to use video of a customer during a transaction in order to detect when items are not being scanned. However, these video-based systems are complex, expensive, and error prone. In particular, if the customer is attempting to hide their behavior from the cameras, it is difficult for video-based systems to detect that an item has not been scanned.

In the embodiments described below, a system is provided that is able to infer human intent to cause a detection failure by inferring human behavior as captured by a transaction log. The system is able to infer that a transaction has a high risk of involving an improperly scanned item, such as an item that was not scanned at all, without the system ever becoming aware of the unscanned item. In particular, the system is able to infer that a transaction is associated with an unscanned item or improperly scanned item without detecting the weight of the unscanned item and without receiving any visual information about the customer or the unscanned item. This creates a less complex system that is nonetheless able to identify transactions that involved an unscanned item.

Figure 1:
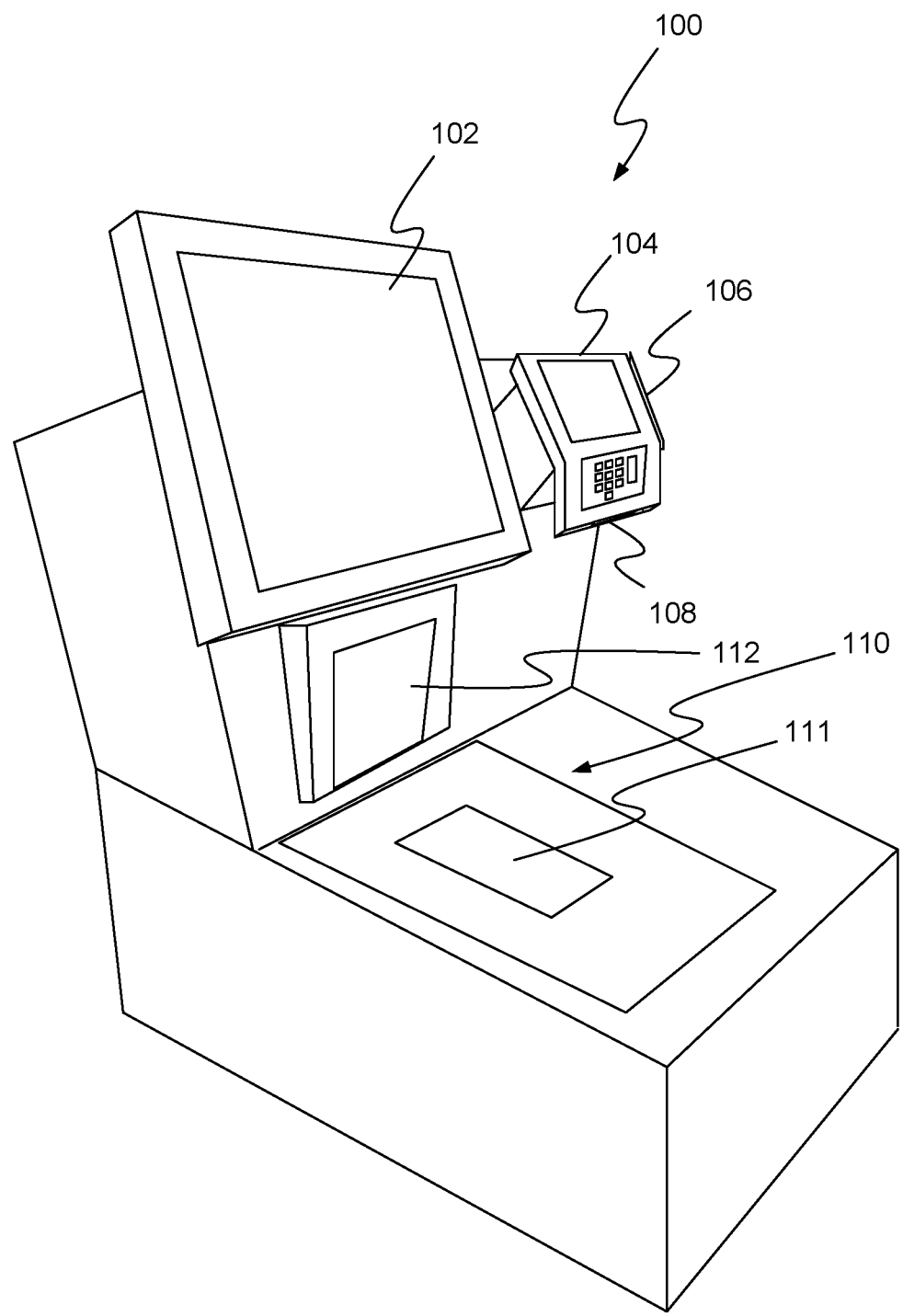
FIG. 1 is a perspective view of a self-service terminal.

FIG. 1 provides a perspective view of a self-service point of sale (POS) 100, which is also referred to as a self-service terminal. POS 100 includes a display 102, a payment terminal 104, including card magnetic strip reader 106 and card chip reader 108. POS 100 also includes barcode scanner 110 consisting of scanner windows 111 and 112 that convey light reflected from barcodes to one or more light sensors that generate electrical signals representative of the barcodes. In some embodiments, the light is a scanning laser light generated by one or more scanning lasers behind windows 111 and/or 112. In other embodiments, the light is ambient light and the light sensors are a sensor array that captures an image of the barcode. Display 102 is an interactive display having a touch sensitive surface that allows the user to start new transactions, enter product identifiers and request that a payment process be started for the transaction by interacting with a user interface displayed on display 102.

Figure 2:
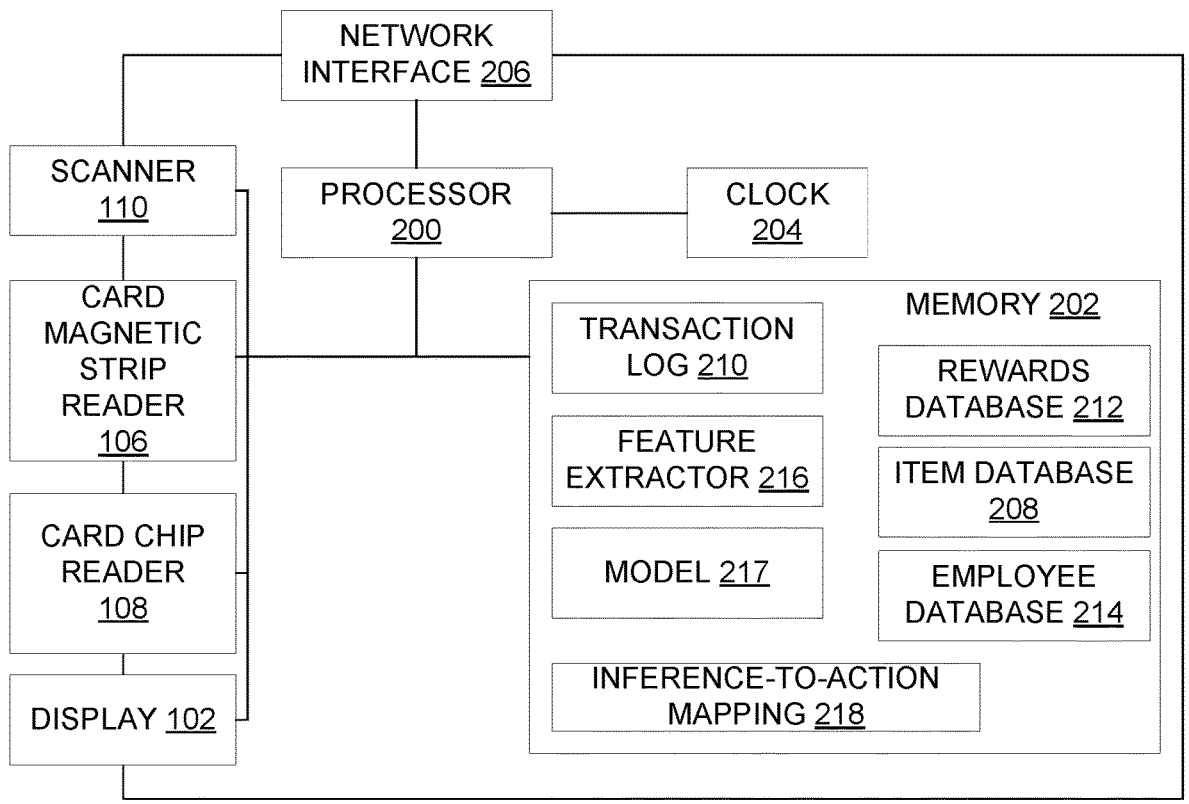
FIG. 2 is a block diagram of a self-service terminal.

FIG. 2 provides a block diagram of POS 100. In FIG. 2, a processor 200 is connected to scanner 110, card readers 106 and 108 and display 102 through input/output buffers and/or input/output processors (not shown). Processor 200 is also connected to a memory 202, a clock 204, and a network interface 206. Memory 202 stores software executed by processor 200 and data created and used by processor 200 as well as data provided by scanner 110, card readers 106 and 108 and display 102. Clock 204 provides a current date and time to processor 200 and network interface 206 allows processor 200 to communicate with computing devices connected to POS 100 through a network.

Figure 3:
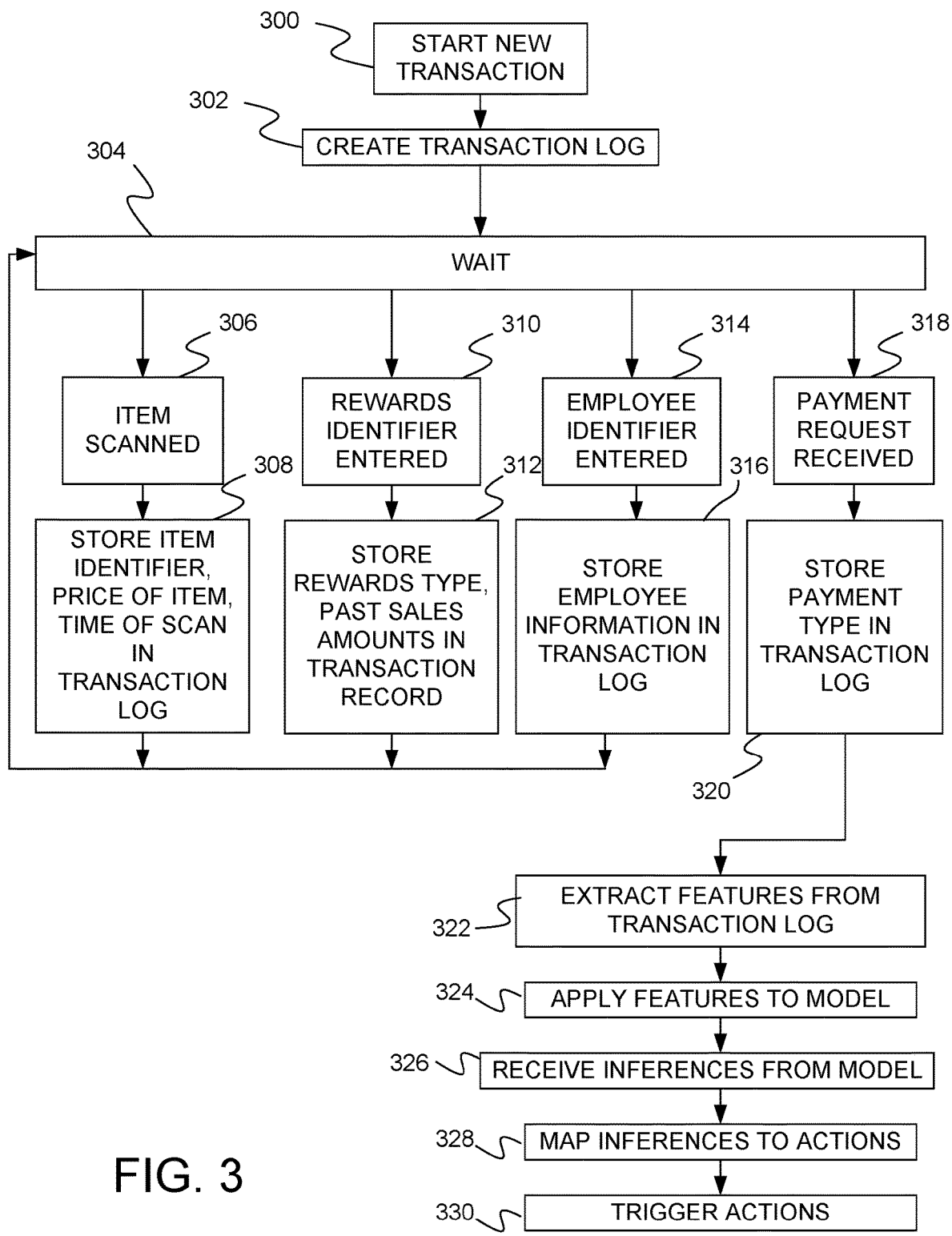
FIG. 3 is a flow diagram of a method for determining an inference for a transaction.

FIG. 3 provides a flow diagram of a method of identifying transactions in which it is likely that at least one item has not been scanned without detecting the unscanned item. At step 300 of FIG. 3, a new transaction is started by either a customer selecting an icon on display 202 or the customer scanning an item. When the transaction begins, a transaction log 210 is created at step 302. If an item was not scanned to begin the transaction, processor 200 waits for an input from scanner 110, card readers 106/109 or display 102 at step 304. When an item is scanned at step 306, scanner 110 obtains information from barcodes on the items and provides that information to processor 200, either directly or by storing the information in a memory for processor 200 to access. At step 308, processor 200 uses the barcode value to search an item database 208 in memory 202 and retrieve an identifier for the item and a price for the item associated with the barcode. Processor 200 then stores the item identifier, the price of the item, and the time at which the scan took place in transaction log 210. Processor 200 then returns to step 304. Steps 306 and 308 are repeated for each item scanned resulting in a separate entry in transaction log 210 for each item that is scanned.

While in wait state 304, processor 200 can also receive a rewards identifier at step 310. Such rewards identifiers can be entered through display 102, by inserting a card in card reader 108, by swiping a card through card reader 106, or by scanning a card using scanner 110, for example. When a rewards identifier is entered at step 310, process 200 accesses a rewards database 212 to retrieve a past sales amount associated with the rewards identifier and the type of rewards associated with the rewards identifier. The rewards type and the past sales are stored in the transaction log 210 in step 312. Processor 200 then returns to wait state 304. Processor 200 can also receive an employee identifier at step 314. The employee identifier can be entered through display 102, by inserting a card in card reader 108, by swiping a card through card reader 106, or by scanning a card using scanner 110, for example. Processor 200 uses an employee database 214 to confirm that the employee identifier is authentic and then stores an employee indicator in transaction log 210 at step 316.

When the user has finished scanning items, they can make a request to begin the payment process using display 102. When this payment request is received at step 318, processor 200 begins the payment process, which can involve one of several different payment types or combinations of payment types including credit card payments, debit card payments, cash payments, gift card payments, and coupons/offers, for example. At step 320, processor 200 stores all applied payment types and their respective payment amounts within transaction log 210.

Using steps 300 through 320, the method obtains a transaction log 210 for a transaction at a self-service terminal. At step 322, processor 200 executes a feature extractor 216 against transaction log 210 to extract features from transaction log 210. In accordance with some embodiments, the extracted features include a number of items scanned, average price of items scanned, time between each scan, average time between each scan, standard deviation of time between scans, rewards type, past sales amount for rewards, information about a person involved in the transaction such as whether the person is a store employee, store payment type, amount of each payment type, and percent of total payment of each payment type, for example. Further features may include whether specific items were involved in a transaction and the number of times the same item was scanned in a transaction. The features described above are examples of features, however the features can include any value that can be determined from transaction log 210. In accordance with some embodiments, the features do not include any information about any unscanned items that may have been present at the self-service POS. In particular, the features do not include any weight that is determined based in part or in whole on the weight of an unscanned item and the features do not include any image data that shows part of or all of an unscanned item.

At step 324, the extracted features are applied to a model 216 executed by processor 200. In accordance with one embodiment, examples of model 216 include a Recurrent Neural Network (RNN), Convolution Neural Network (CNN), Long Short-Term Memory (LSTM), Support Vector Machine, K-Nearest Neighbor, Random Forest, AdaBoost or other machine learning model.

Based on the applied features, the model generates one or more inferences that are received at step 326. For one embodiment, one of these inferences indicates a risk that the transaction involves an unscanned item and in some embodiments, further inferences indicate a type of behavior that may have led to the item not being scanned. For example, one of the inferences may be a probability that the transaction involves an unscanned item. At step 328, processor 200 uses an inference-to-action mapping 218 to map the inference to an action that should be performed, such as halting the transaction and alerting an employee to intervene in the transaction, for example. At step 330, processor 200 triggers the selected action either directly by halting the transaction within POS 100 or by sending a message through network interface 206 to cause an employee to intervene or activating a light on the POS to cause an employee to intervene.

In the embodiment above, the steps of extracting features, applying the features to the model, receiving inferences from the model, mapping the inferences to actions and triggering the actions (steps 322-330) are shown as occurring only after the transaction is complete at step 320. In other embodiments, steps 322-330 are performed after each of steps 308, 312 and 316. In such embodiments, the model produces inferences while the transaction is in process allowing for actions to be triggered before the transaction completes. For example, the transaction can be suspended such that no further items can be scanned and payment cannot be submitted when the model provides certain inferences.

Before model 216 can be used in the method above, model 216 must be trained using a set of training data. One form of training, known as supervised training, uses training data that has been manually labeled. In particular, videos of transactions are reviewed by investigators and the investigators indicate whether there was an unscanned item associated with the transaction. A label corresponding to the investigator's determination is then associated with the transaction log. This process is repeated for other transactions until enough transaction logs have been labeled to allow model 216 to be properly trained.

The goal of training model 216 is to provide a model that can differentiate between a transaction log where an unscanned item was present and a transaction log where no unscanned items were present. In general, better models are achieved when the training data provides a balanced number of transactions involving unscanned items and transactions not involving unscanned items. In addition, a minimum number of each type of transaction is generally needed. However, because the vast majority of transactions do not involve an unscanned item, investigators would have to review a large number of transactions in order to obtain enough transactions involving an unscanned item to create an effective model.

Figure 4:
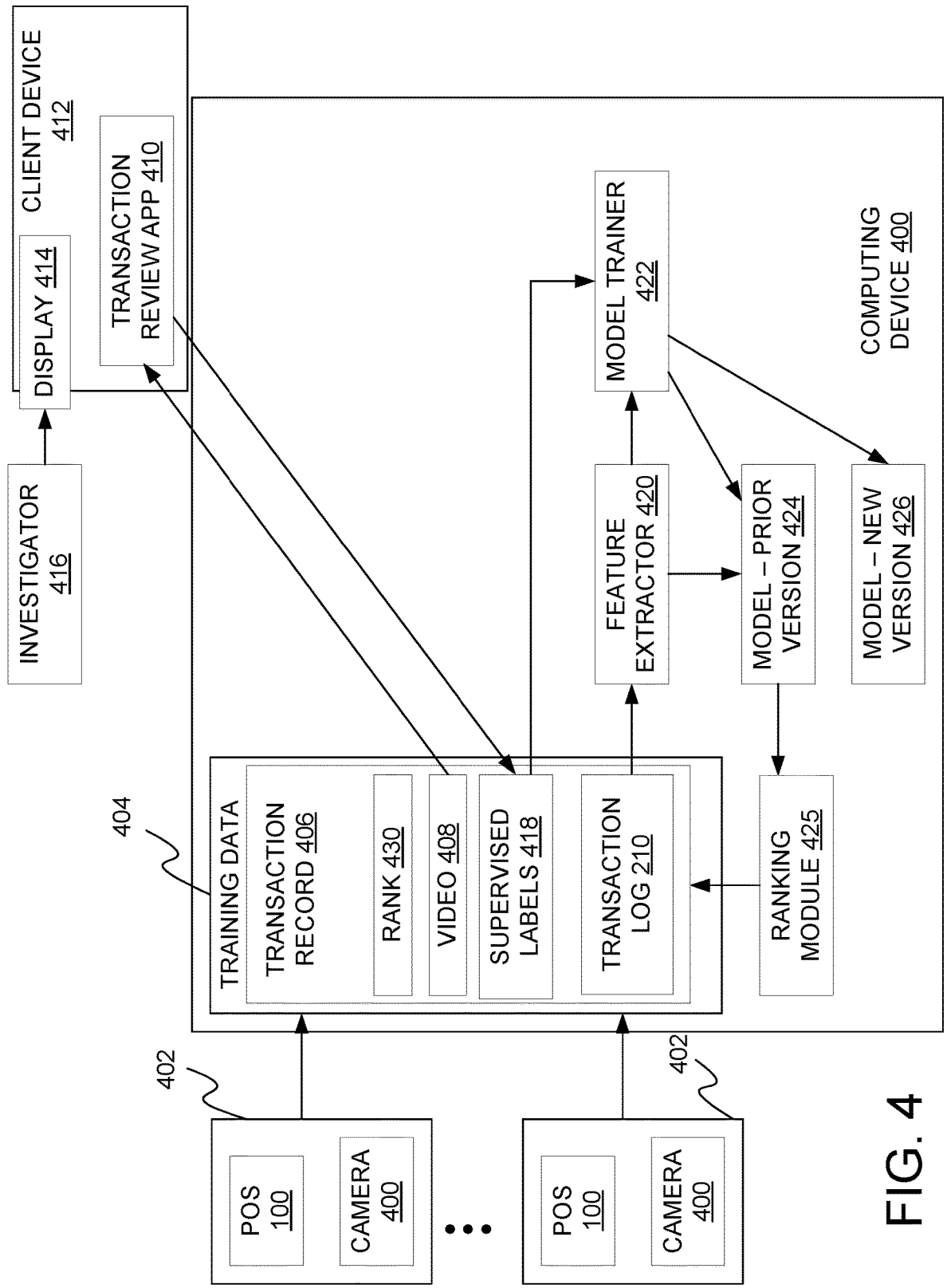
FIG. 4 is a block diagram of a system for training models.

Embodiments described below provide a model training method that reduces the number of videos that an investigator must review in order to produce a sufficient number of labeled transaction logs to train model 216. In particular, the method reduces the number of videos that the investigators must review in order to label enough transactions as involving an unscanned item. FIG. 4 provides a block diagram of elements used in the method and FIG. 5 provides a flow diagram of one embodiment of the method.

Figure 5:
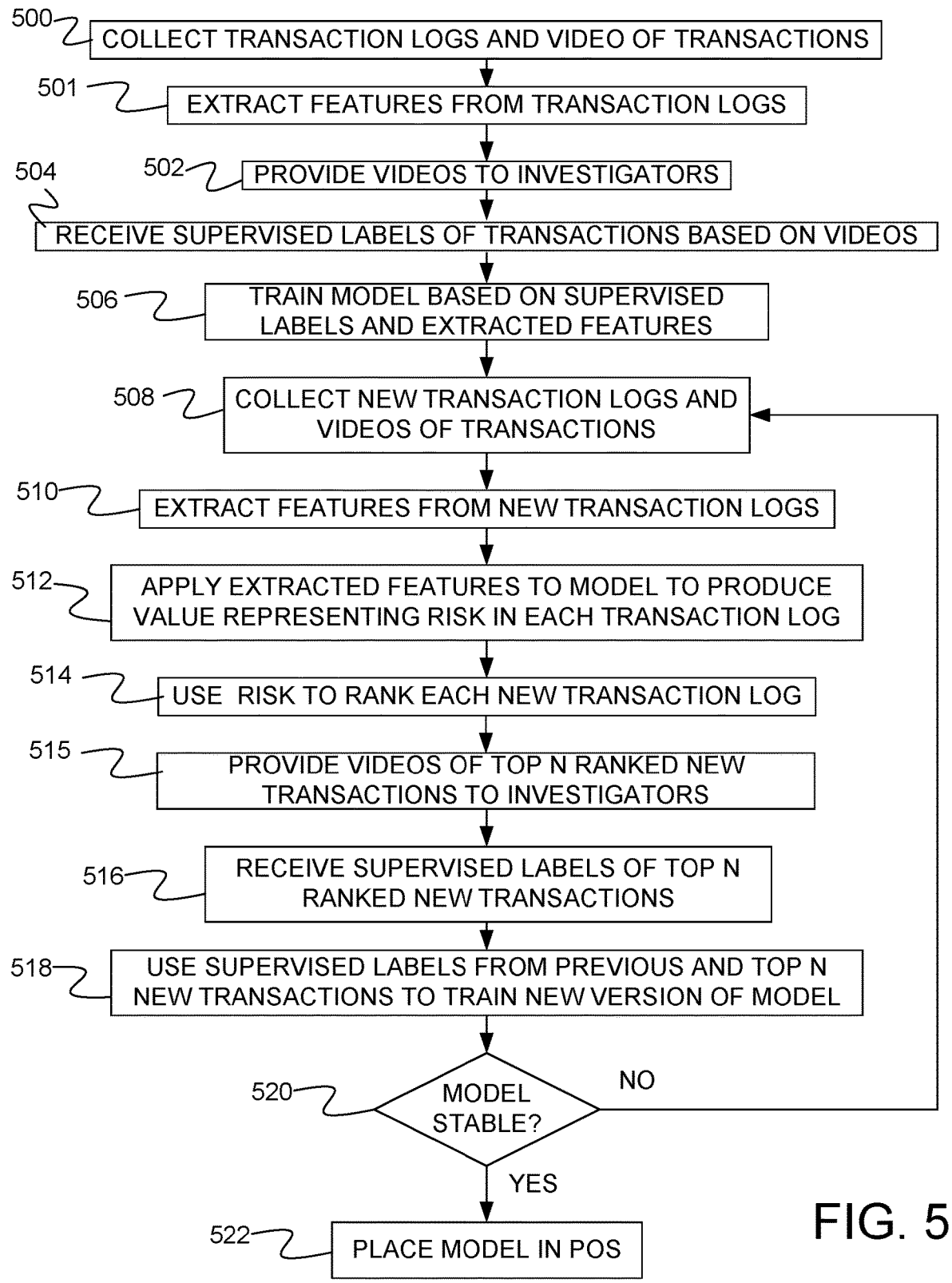
FIG. 5 is a flow diagram of a method of training models.

At step 500 of FIG. 5, transaction logs and videos of transactions are collected to form an initial set of training data 404 that is stored in a computing device 400. The transaction logs are collected from the POS 100 using the method described above in FIG. 3. Video of each transaction is acquired from one or more cameras 400 that capture a view of the POS 100. The combination of a camera 400 and a POS 100 forms a data acquisition unit 402. Multiple data acquisition units 402 within a single building or across multiple buildings may be used to acquire the transaction logs and associated video of the transactions needed to form the training data. For each transaction, a transaction record 406 is formed in training data 404. The transaction record includes the video 408 of the transaction and the transaction log 410 of the transaction. Computing device 400 may be located within a retail store or may be located outside of the retail store.

At step 501, transaction logs 210 of the training data 404 that received supervised labels 418 are applied to a feature extractor 420 to extract features from the transaction logs. At step 502, the extracted features are examined and for transactions that appear suspicious based on the extracted features, videos 408 of the transactions are provided to investigators 416 through a transaction review application 410 executing on a client device 412. In step 502, the number of transaction records 406 provided to transaction review app 410 is relatively small. Transaction review application 410 provides user interfaces on display 414 that allow an investigator 416 to select a video of a transaction for viewing, provides one or more videos of the selected transaction on display 414 and provides user interface controls that allow an investigator 416 to set one or more labels for the transaction. Examples of possible labels include whether the transaction involves an unscanned item and behaviors that occurred at the POS that resulted in the item not being scanned. Examples of such behavior include scanning fake barcodes applied to an item, scanning a barcode of a different item while passing the unscanned item, leaving an item in the cart, removing an item from a cart and placing it in the bagging area without scanning the item, and blocking the barcode on the item to prevent scanning, for example. The labels provided by investigator 416 for the transaction are returned by transaction review app 410 at step 504 and are stored in transaction record 406 as supervised labels 418.

At step 506, the features extracted at step 501 and the corresponding supervised labels 418 are used by a model trainer 422 executing in computing device 400 to train a model 424. In accordance with one embodiment, examples of model 424 include a Recurrent Neural Network (RNN), Convolution Neural Network (CNN), Long Short-Term Memory (LSTM), Support Vector Machine, K-Nearest Neighbor, Random Forest, AdaBoost or other machine learning model. In accordance with one embodiment, model 424 is the same type of model as model 216. In other embodiments, model 424 is a different type of model than model 216. In a preferred embodiment, model 424 takes in features extracted from transaction logs and for each transaction log, generates a value representing a relative likelihood, such as a percentage chance, that the transaction involves an unscanned item.

Once model 424 has been trained, additional new transaction logs and videos of transactions are received at step 508. This results in new transaction records 406. At step 510, the transaction logs 210 of each new transaction is applied to feature extractor 420 to produce a set of features for each transaction. At step 512, the extracted features for each transaction are applied to model 424 by computing device 400 to produce a value representing a risk that an unscanned item was present at the transaction. Thus, for each new transaction that has yet to receive a supervised label 418, model 424 provides an estimate of how likely it is that the transaction involved an unscanned item. The risk values produced by model 424 are provided to a ranking module 425 along with an identifier for the transaction record 406 from which the risk value was determined. At step 514, ranking module 425 executed by computing device 400 uses the risk value of each of the new transaction records to set a rank 430 for each transaction record 406 that has yet to receive a supervised label 418 with transaction records that have a higher risk be ranked higher than transaction records with a lower risk.

At step 515, videos 408 of the top N ranked new transactions are provided to investigators 416 through transaction review application 410 executing on a client device 412. In step 515, the number of transaction records 406 provided to transaction review app 410 is limited based on the rank 430 of the transaction records so that the investigators do not have to review all of the new transaction records in training data 404. This makes the system more efficient and reduces the workload placed on investigators 416. Using the user interface controls provided by transaction review application 410, investigators 416 set one or more labels for each of the top N ranked transactions. At step 516, the labels provided by investigators 416 are received and stored in training data 404.

At step 518, the supervised labels 418 for the top N ranked new transactions provided by investigator 416, as well as the supervised labels 418 for the previous transaction records are used to train a new version of the model. In particular, the supervised labels 418 of the previous transactions and the top N new transactions are provided to model trainer 422 along with the features extracted from the transaction logs 210 of those transactions. Model trainer 422 then creates a new model 426 based on the transaction logs and corresponding supervised labels.

At step 520, the method determines if the new model 426 is stable. A model is considered stable when it does not change much between training iteration. If the model is not stable, the process of FIG. 5 returns to step 508 to collect new transaction logs and videos of transactions. Steps 510-518 are then repeated for the new set of transaction logs. When returning to step 518, all transaction records that received a supervised label 418 are used in training the next version of the model. When the model becomes stable at step 520, the model is placed in POS 100 or in some other computing device at step 522 so that it can be used to identify transactions that are at high risk of involving an unscanned and undetected item.

After a stable model has been provided, periodic model training continues so that new versions of the model are produced and are pushed to the POS or other computing device. The new versions of the model are thereby able to adapt to new efforts to remove items from the store without scanning the items. In some embodiments, the new versions of the model are trained using steps 508-518 of FIG. 5 together with transaction logs and videos of recent transactions. In other embodiments, in addition to or instead of using manual review of videos to label recent transactions as being associated with an unscanned item, one or more other detection systems are used to label recent transactions as being associated with unscanned items. These other detection systems, such as RFID detectors, automatically provide labels for the recent transactions that can then be used to train the latest version of the model.

Figure 6:
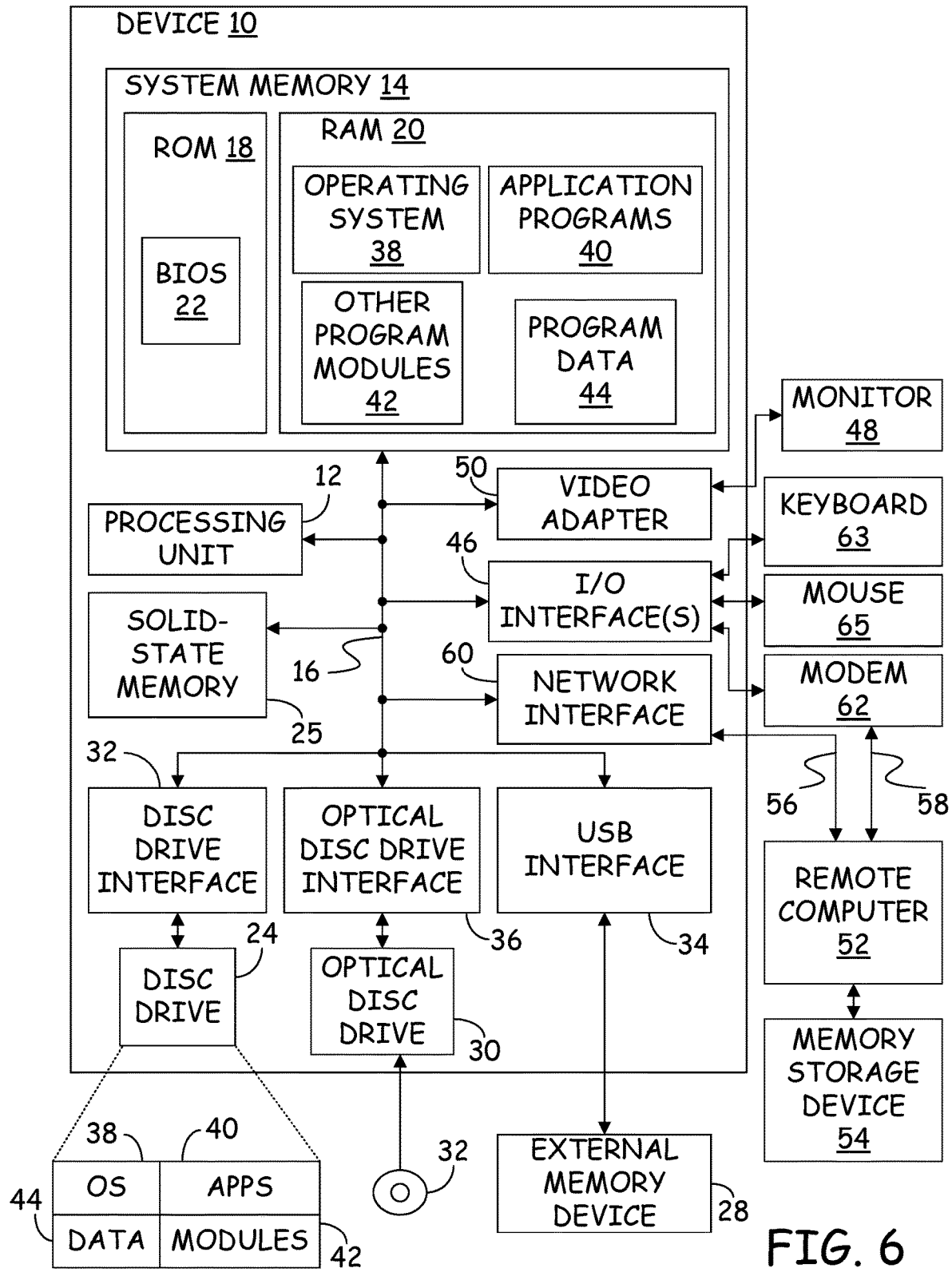
FIG. 6 is a block diagram of a computing device used to train models.

FIG. 6 provides an example of a computing device 10 that can be used as computing device 400 and/or client device 412. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 6. The network connections depicted in FIG. 6 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 6 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
obtaining a transaction log for a transaction at a self-service terminal during which the self-service terminal fails to detect the presence of an item at the self-service terminal;
extracting features from the transaction log;
applying the features to a model to generate an inference for the transaction, wherein the model is trained based on a set of previous transactions that have been labeled; and
using the inference to determine whether to issue an alert that improper scanning has occurred at the self-service terminal.

2. The computer-implemented method of claim 1 wherein the inference indicates that the item was not scanned at the self-service terminal.

3. The computer-implemented method of claim 1 wherein the inference indicates a type of improper scanning that has occurred.

4. The computer-implemented method of claim 1, wherein the set of previous transactions are selected from a larger set of previous transactions using a previous version of the model.

5. The computer-implemented method of claim 4 wherein the previous version of the model is used to rank transactions in the larger set of transactions.

6. The computer-implemented method of claim 5 wherein the set of previous transactions are labeled after being selected using the previous version of the model.

7. The computer-implemented method of claim 1 wherein extracting features from the transaction log and applying the features to the model to generate the inference occur before the transaction is complete.

8. The computer-implemented method of claim 1 wherein the model is periodically retrained.

9. A self-service terminal comprising:
- a scanner that scans items during a transaction to obtain information from barcodes on the items;
- a processor that:
- generates a transaction log based on the obtained information;
- extracts features from the transaction log;
- applies the features to a model without information about unscanned items to identify an inference for the transaction, wherein the model is trained based on a set of previous transactions that have been labeled; and
- uses the inference to determine whether to issue an alert for the transaction.

10. The computer-implemented method of claim 9, wherein the set of previous transactions are selected from a larger set of previous transactions using a previous version of the model.

11. The computer-implemented method of claim 10 wherein the previous version of the model is used to rank transactions in the larger set of transactions.

12. The computer-implemented method of claim 11 wherein the set of previous transactions are labeled after being selected using the previous version of the model.

13. A method comprising:
- receiving a number of items scanned during a transaction at a self-service terminal; and
- applying the number of items scanned to a model to obtain an indication of whether the transaction is suspected of involving a shortage event, wherein the model is trained based on a set of previous transactions that have been labeled, wherein the set of previous transactions are selected from a larger set of previous transactions using a previous version of the model.

14. The method of claim 13 wherein applying the number of items scanned during the transaction to the model further comprises applying a price of at least one scanned item to the model.

15. The method of claim 13 wherein applying the number of items scanned during the transaction to the model further comprises applying information about a person involved in the transaction to the model.

16. A self-service terminal comprising:
- a scanner that scans items during a transaction to obtain information from barcodes on the items;
- a card reader that reads card information on a card;
- a processor that:
- generates a transaction log based on the obtained information and stores the card information in the transaction log;
- extracts features from the transaction log, wherein extracting features comprises extracting at least one feature based on the card information;
- applies the features to a model without information about unscanned items to identify an inference for the transaction; and
- uses the inference to determine whether to issue an alert for the transaction, wherein the alert indicates improper scanning of items.

* * * * *